United States Patent [19]

Re et al.

[11] Patent Number: 4,959,426
[45] Date of Patent: Sep. 25, 1990

[54] EPOXY RESINS PREPARED BY CO-CURING FLUORINATED EPOXY PREPOLYMERS AND NON-FLUORINATED EPOXY PREPOLYMERS

[75] Inventors: Alberto Re, Milan; Marco De Giorgi, Varese, both of Italy

[73] Assignee: Ausimont S.r.l., Milan, Italy

[21] Appl. No.: 267,733

[22] Filed: Nov. 3, 1988

Related U.S. Application Data

[63] Continuation-in-part of Ser. No. 130,937, Dec. 10, 1987, abandoned.

[30] Foreign Application Priority Data

Dec. 16, 1986 [IT] Italy .................. 22696 A/86

[51] Int. Cl.$^5$ .................. C08L 63/02; C08L 63/04; C08L 63/06
[52] U.S. Cl. .................. 525/527; 525/481; 525/486; 525/488
[58] Field of Search ................ 525/527, 481, 486, 488

[56] References Cited

U.S. PATENT DOCUMENTS

| | | | |
|---|---|---|---|
| 3,852,222 | 12/1974 | Field et al. | 260/2 EP |
| 3,872,045 | 3/1975 | Field et al. | 525/527 |
| 4,132,681 | 1/1979 | Field et al. | 525/121 |
| 4,306,053 | 12/1981 | Harrison et al. | 528/77 |
| 4,699,969 | 10/1987 | Re et al. | 528/110 |
| 4,833,227 | 5/1989 | Re et al. | 528/108 |

FOREIGN PATENT DOCUMENTS 58-206674 12/1983 Japan .................. 525/527

*Primary Examiner*—Lewis T. Jacobs
*Assistant Examiner*—Robert E. L. Sellers, II
*Attorney, Agent, or Firm*—Stevens, Davis, Miller & Mosher

[57] ABSTRACT

A non-fluorinated epoxy prepolymer of known type is mixed with a fluorinated epoxy prepolymer containing perfluoropolyether blocks or perfluoroalkylene blocks of type $-(CF_2CF_2)_n-$ and/or of type

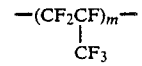

and the two prepolymers are co-cured by treating the mixture with cross-linking agents of known type suitable for epoxy resins, thereby obtaining a cross-linked epoxy resin having a fluorine content $\leq 30\%$ by weight, preferably $\leq 25\%$ by weight.

3 Claims, No Drawings

EPOXY RESINS PREPARED BY CO-CURING FLUORINATED EPOXY PREPOLYMERS AND NON-FLUORINATED EPOXY PREPOLYMERS

This application is a Continuation-In-Part of application Ser. No. 130,937, filed Dec. 10, 1987, now abandoned.

The present invention relates to partially fluorinated epoxy resins obtained by co-curing a mixture of non-fluorinated epoxy prepolymers of known type with fluorinated epoxy prepolymers containing perfluoroalkylene blocks of type: —$(CF_2CF_2)_n$— and/or of type

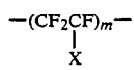

wherein X is a $C_1$–$C_3$ perfluoroalkyl or a halogen other than fluorine, described in European Patent Application No. 271872 (equivalent to U.S. Pat. No. 4,833,227), or containing perfluoropolyether blocks as are described in published European patent application No. 212,319 (equivalent to U.S. Pat. No. 4,699,969) both in the name of Re et al.

The mixture of epoxy prepolymers can be cured by means of fluorinated or non-fluorinated cross-linking agents to provide cross-linked resins having improved characteristics with respect to the known corresponding resins not containing fluorine.

The specific characteristics of the cross-linked resins prepared according to the present invention are:
surface properties which impart oil- and -water-repellency as well as a low friction coefficient to the product;
stability to hydrolysis and minimum absorption of water;
stability to solvents;
advantageous dielectric characteristics, in particular as regards dielectric constant and volume resistivity;
improved flexibility and high impact strength.

The present invention is based on the surprising discovery that a prepolymer consisting of a non-fluorinated epoxy resin is fully miscible with a fluorinated epoxy prepolymer containing fluoroalkylene chains or perfluoropolyether chains, and that subsequently the co-curing of the two starting prepolymers can be readily obtained by treating the mixture with a conventional cross-linking agent suitable for epoxy resins. Furthermore, it has surprisingly been found that the product so obtained possess the typical characteristics of an epoxy resin prepared starting from a fluorinated epoxy polymer having the structure of a fluoroalkane or of a perfluoropolyether.

The process according to the invention provides cross-linked products which, although they have a low fluorine content from 1% to 30% by weight and preferably ranging from 1% to 25% by weight, exhibit the same typical surface characteristics of cross-linked epoxy resins having a high fluorine content, from such characteristics deriving the high oil-repellency and water-repellency, the minimum water absorption, the high stability to hydrolysis and to solvents.

Non-fluorinated epoxy prepolymers of known type suitable for being used according to the present invention are the ones obtained from epichlorohydrin and from a diol containing one or more aromatic or cycloaliphatic or polycyclic or heterocyclic rings.

In particular, the following epoxy resins are suitable as prepolymers in the invention:
Epoxy resins deriving from bisphenol A - epichlorohydrin

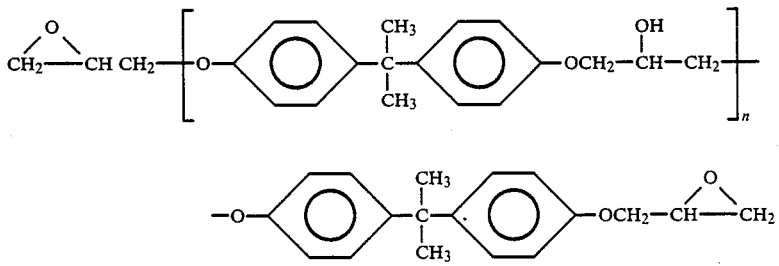

where n=0–25
Epoxy cresol novolak resins

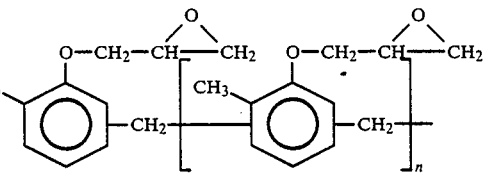

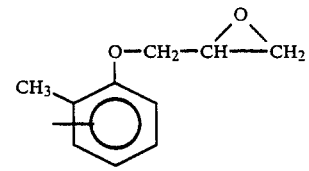

where n=1.7–4.4
Epoxy phenolic novolak resins

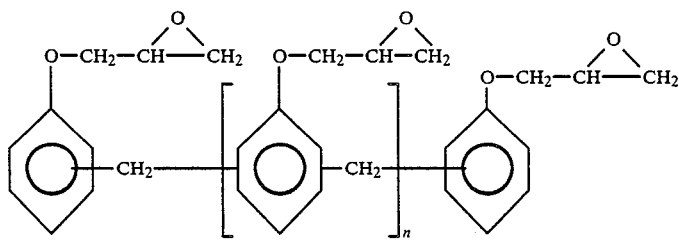

where n=0.2–3.5
Resins from bisphenol F

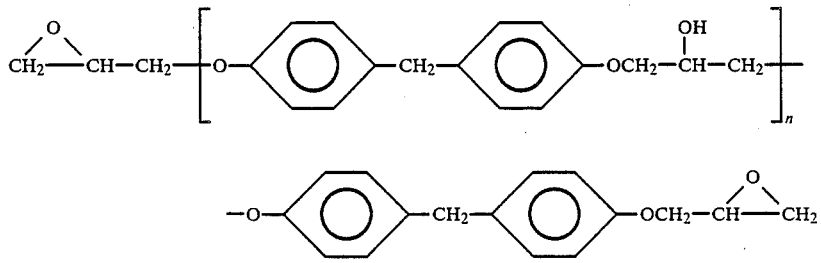

n=about 0.15
Polynuclear resins from phenol-glycidyl ether

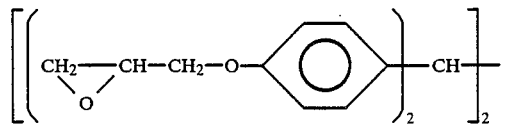

Resins from tetraglycidylmethylenedianiline

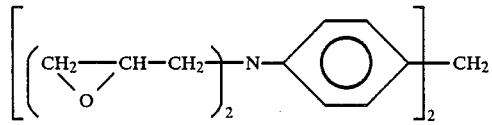

Resins from triglycidyl-isocyanurate

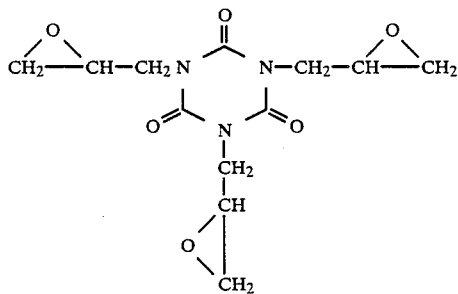

Resins from diglycidyl-hydantoin

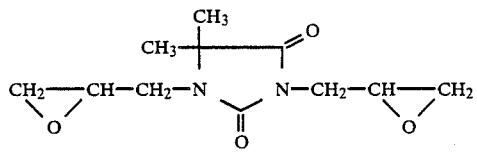

Resins deriving from bisphenols or other halogen monomers, for example tetrabromobisphenol A and tetrachlorobisphenol A.

It is possible to utilize as prepolymers a mixture of one or more of the above-cited resins.

The prepolymers with a high fluorine content to be utilized in the mixture are comprised in the following general formula:

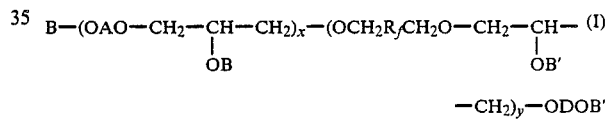

where:
x is an integer from 0 to 20;
y is an integer from 0 to 20;
B and B', either like or different from each other, are H or

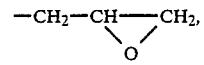

at least one of them being

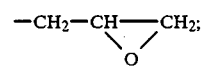

A is a radical of a fluorinated or non-fluorinated diol containing one or more aromatic or cycloaliphatic or polycyclic or heterocyclic rings;
D=—CH$_2$R$_f$CH$_2$— and may be also A when y different from 0;
R$_f$ is a fluoroalkylene radical —(CH$_2$)$_q$(CF$_2$CF$_2$)$_n$—(CH$_2$)$_q$— or

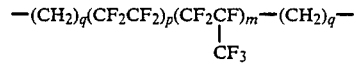

where n=2–8, q=0 or 1, p=1–8, m=1–8, or $R_f$ is a perfluoropolyether radical containing sequences of fluoro-oxyalkylene units selected from:
—$CF_2CF_2O$—, —$CF_2O$—, $OCF_2CF_2CH_2$—, —$CF(CF_3)O$—,

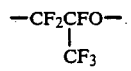

the units having index x and y can be at random distribution in the chain.

Fluorinated epoxy prepolymers of the former type, comprising the fluoroalkylene radicals, are described in European patent application No. 271872 those of the latter type comprising the perfluoropolyether radicals, are described in published European patent application No. 212,319, both in the name of Re et al.

The epoxy resins (prepolymers) utilizable for the present invention, may be liquid, solid or in solution, as a function of the fields of use. The liquid epoxy resins predominantly contain epoxy end groups and free hydroxyl groups inside the chain. The known technology for cross-linking epoxy resins by means of conventional cross-linking agents is fully utilizable in the present invention.

Thus, in accordance with the structure, curing can be carried out by means of the cross-linking agents which are commonly used for the resins, for example anhydrides of polycarboxylic acids, polyfunctional amines, polyamides, polyaminoamides (obtained from polyamines and dimers of fatty acids), polyphenols, polythiols, polycarboxylic acids, polyisocyanates, according to methodologies which are well known to those skilled in the art.

The utilizable polyamines can be primary or secondary, aliphatic or aromatic; examples thereof are meta-phenylenediamine, diethylenetriamine and xylylenediamine. The diamine is used in such amount as to have an aminohydrogen for each epoxide equivalent, variations of ±10% being allowable.

It is possible also to use anhydrides, such as for example phthalic, hexahydrophthalic, methyltetrahydrophthalic, trimellitic, pyromellitic, 2-dodecyl-succinic, methyl endomethylene-tetrahydrophthalic (methylnadic) anhydride.

In order to reduce the reaction times and temperatures, accelerants such as n-butyl imidazole, tris(dimethylaminomethyl)phenol, benzyldimethylamine, triethanolamine are added in amounts from 0.5 to 1% by weight referred to the resin.

Furthermore it is possible to use di-, tri- and tetraisocyanates such as e.g. hexamethylene diisocyanate (HDI), isophorone diisocyanate (IPDI), toluene diisocyanate (TDI), methylene-bis-(4-cyclohexyl-diisocyanate) ($H_{12}MDI$) and trimers of TDI and HDI.

The reaction which gives rise to the urethanic bond can be catalyzed or not catalyzed by the catalysts which are utilized in the technology of the polyurethanes obtained from polyols and polyisocyanates. In any case, the addition of an efficient catalytic system permits to operate at a low temperature (20°-60° C.) and in short times. Furthermore, by properly dosing the catalyst it is possible to optimize the pot life, namely the time during which the reaction mixture remains fluid enough.

As catalysts it is possible to utilize tin derivatives such as tin butyl dilaurate, tin dibutyl acetate, tin dibutyl oxide, derivatives of iron such as iron acetylacetonate, titanium alcoholates such as titanium tetraisopropylate, tertiary amines such as triethylamine, in amounts ranging from 0.001 to 2% by weight, preferably from 0.01 to 0.5% by weight calculated on the total weight.

Furthermore, a class of cross-linking agents which are particularly useful to obtain fluorinated epoxy resins with a high fluorine content is the one of the agents having perfluoroether chain, which are specified in European patent application No. 87-107,024 in the name of Re et al.

The cross-linking reaction can be conducted for example at room temperature (with a non-aromatic amine) up to temperatures higher than 200° C. (with an anhydride).

Mixing of the non-fluorinated epoxy prepolymer of known type with the fluorinated epoxy prepolymer can be carried out in mass or with the addition of a solvent, depending on the composition in question.

Generally, the mixing of the fluorinated prepolymer does not rise particular problems. In some cases, however, mixing can be favoures by addition or proper solvents such as esters, for example butylacetate and amylacetate; ketones, for example acetone methylethylketone and methylisobutylketone, and aromatic hydrocarbons, for example xylene and toluene, optionally in admixture with characteristic solvents for perfluoropolyethers, such as 1,1,2-trichlorotrifluoroethane (DELIFRENE ® LS).

On conclusion of the admixing, it is possible to remove the solvent and to add the curing agent to the mass or to conduct the cross-linking in solution.

The amount of solvent depends on the solution viscosity to be obtained and on the particular application.

The formulations of the epoxy resins prepared in accordance with the present invention can include other ingredients such as pigments or fillers of a different nature, in relation to the requirements of the various fields of use, which are suited to reduce the costs of the article, to increase the consistency thereof, to favour the levelling of the pigment inside the resin, or to help in reinforcing the structure of the resin in the mechanical respect.

The pigments and other fillers, of pigmentary nature or not, can be added to coat and/or protect the surface on which the resin is spread, for example by reflecting the destructive sunlight rays which otherwise could pass through the resin and cause the decay of the underlying material.

The resins obtained from the polymers of the invention, in spite of their low fluorine content, are consistent with particular fillers such as, for example, polytetrafluoroethylene (PTFE) and $C_2F_4/C_3F_6$ copolymers (FEP), which may be added to improve some mechanical characteristics, such as impact strength and resistance to abrasion.

The use, according to the present invention, of cross-linking agents with perfluoropolyether chain imparts to the conventional epoxy resins highly improved chemico-physical and mechanical characteristics with respect to the hydrogenated epoxy resins of the prior art, so allowing the obtainable materials to be suitable for a plurality of appliances.

In particular, the resins obtainable in accordance with the present invention are characterized by:
high stability to hydrolysis, chemical agents and atmospherical agents,
high thermal stability,
low refraction index,
considerable dimensional stability, low wettability,
self-lubricating properties,
excellent mechanical properties,
water-repellency, oil-repellency,
antiflame properties,
low dielectric constant.

In consideration of such exceptional characteristics, a few applicative fields for the products of the invention are those of adhesive, of structural materials and of high-performance composite materials to be used for example in the aeronautical sector or in the sector of electronics, as supporting resins for printed circuits, capsulating materials for chips, connecting resins for electric cables.

Furthermore, a very broad field of use is that of coatings and paints in general, and in particular for printed circuits, magnetic tapes and discs, optical readout discs, optical fibres and optical systems in general, paints for aeronautical and aerospace uses, barried paints for marine environments, hydrophobic coatings for submarine systems, coatings of mechanical parts immerged in solvents and in general coatings of metal systems subjected to corrosion.

In particular, the perfluoropolyethereal component forms a rubber-like phase, which, in interpenetration with the rigid epoxy matrix, imparts to the final product improved properties of tenacity, flexural strength and impact strength.

The following examples are given for a merely illustrative purpose, without being, however, a limitation of any possible embodiments of the invention.

EXAMPLE 1

10.3 g of a liquid epoxy resin prepared from bisphenol A and epichlorohydrin, having an equivalent weight equal to 190, were mixed with 14.7 g of a fluorinated resin (prepared according to the procedure illustrated in Example 2 of the European patent application No. 271872, in the name of Re et al) having an epoxy equivalent weight equal to 900.

22.5 g of methylnadic anhydride and 0.25 g of 1-butylimidazole were added to the mixture so obtained.

The epoxy polymer (fluorine content=10%) was cross-linked in an oven at 100° C. for 1 hour and was post-crosslinked at 165° C. for 30 minutes. The resulting glass-like transparent material exhibited the following properties:
glass transition temperature=154° C.,
water abdorption (96-hour immersion at 25° C., ASTM D570)=0.2% by weight,
contact angle ($H_2O$)=90°,
friction coefficient=0.13.

EXAMPLE 1a (comparative test)

The same liquid epoxy resin prepared from bisphenol A and epichlorohydrin and cross-linked with methylnadic anhydride and 1-butylimidazole in the same proportions and according to the same procedure as described in Example 1, exhibited the following characteristics:
glass transition temperature=154° C.,
water absorption=0.3% by weight,
contact angle ($H_2O$)=62°,
friction coefficient=0.35.

EXAMPLE 2

21.4 g of a fluorinated resin prepared as is described in example 6 of published European patent application No. 212,319, having an epoxy equivalent weight equal to 2140, were mixed with 15.0 g of a liquid epoxy resin based on bisphenol A and epichlorohydrin having an epoxy equivalent weight equal to 190. To the resulting mixture there were added 32.75 g of methylnadic anhydride and 0.36 g of 1-butyl-imidazole. The epoxy polymer (fluorine content=18%) was cross-linked in oven at 100° C. for 1 hour and post-cross-linked at 165° C. for 1 hour. The resulting material exhibited the following properties:
water absorption (96 hours, 25° C.)=0.2% by weight
contact angle ($H_2O$)=95°
friction coefficient=0.12
improved impact strength characisticd with respect to the resin of Example 1a.

EXAMPLE 3

90 g of a liquid epoxy resin prepared from bisphenol A and epichlorohidrin, having an equivalent weight equal to 190, were mixed with 10 g og a fluorinated epoxy resin (prepared according to the procedure illustrated in Example 4 of European patent application No. 271872) having an epoxy equivalent weight equal to 800.

65 g of methylnadic anhydride and 1 g of 1-butylimidazole were added to the mixture so obtained.

The epoxy polymer (fluorine content=2%) was crosslinked in an oven at 100° C. for 1 hour and was post-crosslinked at 165° C. for 1 hour. The resulting glass-like, transparent material exhibited the following properties:
glass transition temperature: 129° C.;
water adsorption: 0.25% by weight;
dielectric constant (22° C.): 3.1;
dissipation factor: $2.5 \cdot 10^3$.

EXAMPLE 3a

The same liquid epoxy resin prepared from bisphenol A and epichlorohidrin and cross-linked with methylnadic anhydride and 1-butylimidazole in the same proportions and according to the same procedure as described in Example 3, exhibited the following characteristics:
glass transition temperature: 131° C.;
water adsorption: 0.35% by weight;
dielectric constant (22° C.): 3.4;
dissipation factor: $2.5 \cdot 10^{-3}$.

EXAMPLE 4

90 g of a liquid epoxy resin prepared from bisphenol A and epichlorydrin, having an equivalent weight equal to 190, were mixed with 10 g of the fluorinated epoxy resin of Example 6 of EP No. 212319.

65 g of methylnadic anhydride and 1 g of 1-buthylimidazole were added to the mixture so obtained.

The epoxy polymer (fluorine content=2.5%) was cross-linked in an oven at 100° C. for 1 hour and was post-cross-linked at 165° C. for 1 hour.

The resulting glass-like, transparent material exhibited the following properties:
glass transition temperature: 146° C.;
water adsorption: 0.25% by weight;
dielectric constant (22° C.): 2.4;
dissipation factor: $1.5 \cdot 10^{-3}$.

What we claim is:

1. A cross-linked epoxy fluorinated resin containing from 1% to 30% by weight of fluorine, prepared by co-curing, by means of known cross-linking agents suitable for epoxy resins, a mixture of:

(a) an epoxy prepolymer containing fluoro-alkylene or perfluoropolyether blocks of the formula:

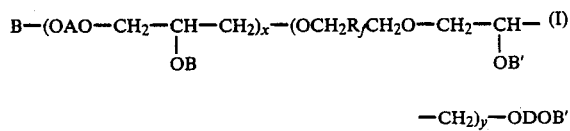

where:
x is an integer from 0 to 20; and
y is an integer from 0 to 20;
B and B', either like or different from each other, are H or

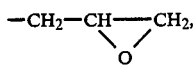

at least one of them being

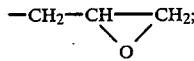

A is a radical of a fluorinated diol containing one or more aromatic rings;
D=—CH$_2$R$_f$CH$_2$— and may be also A when y is different from 0;

R$_f$ is either a fluoroalkylene radical —(CH$_2$)$_q$(CF$_2$CF$_2$)$_n$—(CH$_2$)$_q$— where n is an integer from 2 to 8 and q is 0 or 1,

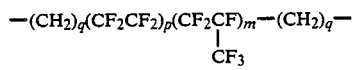

where n=2-8, q=0 or 1, p=1-8 and m=1-8 or a perfluoropolyether radical containing sequences of fluoro-oxyalkylene units selected from the and consisting of:

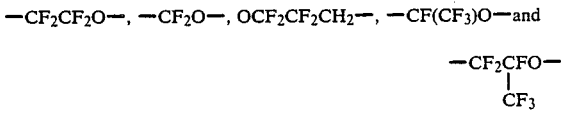

wherein the units having index x and y can be in random distribution in the chain;
and of:
(b) a non-fluorinated epoxy prepolymer having at least two epoxy groups per molecule obtained from epichlorohydrin and from a diol containing one or more aromatic rings.

2. The resin according to claim 1, containing from 1% to 25% by weight of fluorine.

3. The resin according to claim 1, cured by using cross-linking agents selected from the group consisting of:
- anhydrides of polycarboxylic acids,
- polyfunctional amines,
- polyphenols, and
- polyisocyanates.

* * * * *